(12) United States Patent
Cryan et al.

(10) Patent No.: US 6,598,428 B1
(45) Date of Patent: Jul. 29, 2003

(54) MULTI-COMPONENT ALL GLASS PHOTONIC BAND-GAP FIBER

(75) Inventors: Colm Cryan, Arlington, MA (US);
Karim Tatah, Arlington, MA (US);
Richard Strack, Sturbridge, MA (US)

(73) Assignee: Schott Fiber Optics, Inc., Southbridge, MA (US)

( * ) Notice: Subject to any disclaimer, the term of this patent is extended or adjusted under 35 U.S.C. 154(b) by 0 days.

(21) Appl. No.: 09/659,199

(22) Filed: Sep. 11, 2000

(51) Int. Cl.$^7$ ............................................. C03B 37/028
(52) U.S. Cl. ......................................... 65/409; 65/411
(58) Field of Search ................... 65/409, 411

(56) References Cited

U.S. PATENT DOCUMENTS

| | | | | |
|---|---|---|---|---|
| 3,253,896 A | * | 5/1966 | Woodcock | 65/409 |
| 3,350,183 A | * | 10/1967 | Siegmund | 65/411 |
| 3,504,060 A | * | 3/1970 | Gardner | 65/409 |
| 4,011,007 A | * | 3/1977 | Phaneuf | 65/409 |
| 4,127,398 A | * | 11/1978 | Singer | 65/409 |
| 4,389,089 A | * | 6/1983 | Strack | 65/409 |
| 4,407,667 A | * | 10/1983 | Le Noane | 65/407 |
| 4,497,643 A | * | 2/1985 | Kowata | 65/409 |
| 4,710,216 A | * | 12/1987 | Harada | 65/411 |
| 4,832,722 A | * | 5/1989 | Henderson | |
| 4,838,642 A | | 6/1989 | De Jong et al. | |
| 4,912,314 A | * | 3/1990 | Sink | |
| 4,978,377 A | * | 12/1990 | Brehm | 65/412 |
| 5,223,013 A | * | 6/1993 | Cook | 65/409 |
| 5,609,952 A | | 3/1997 | Weiss | |
| 5,636,299 A | | 6/1997 | Bueno et al. | |
| 5,754,715 A | | 5/1998 | Melling | |
| 5,802,236 A | * | 9/1998 | DiGiovanni | |
| 5,815,625 A | | 9/1998 | Sugawara | |
| 5,940,565 A | | 8/1999 | Sugawara | |
| 5,953,477 A | | 9/1999 | Wach et al. | |
| 5,958,584 A | | 9/1999 | Petisce | |
| 5,974,211 A | | 10/1999 | Slater | |
| 6,243,522 B1 | * | 6/2001 | Allan | |
| 6,260,388 B1 | * | 7/2001 | Borrelli | |
| 6,301,420 B1 | * | 10/2001 | Greenaway | |

FOREIGN PATENT DOCUMENTS

| | | | |
|---|---|---|---|
| WO | WO/00/49436 | * | 8/2000 |
| WO | WO 01/42829 | * | 6/2001 |

OTHER PUBLICATIONS

Knight et al., All–silca single–mode optical fiber with photonic crystal cladding, Optical Letters, vol. 21, No. 19, Oct. 1, 1996.
Birks et al., Endlessly single–mode photonic crystal fiber, Opticla Letters, vol. 22, No. 13, Jul. 1, 1997.
Knight et al., Photonic Band Gap Guidance in Optical Fibers, Science, vol. 282, Nov. 20, 1998.

* cited by examiner

*Primary Examiner*—John Hoffmann
(74) *Attorney, Agent, or Firm*—Volpe and Koenig, P.C.

(57) ABSTRACT

A method of producing an all glass, non-porous, multi-component photonic band-gap fiber is provided. The fiber is formed by creating a preform having a plurality of low refractive index glass rods and a plurality of high refractive index glass rods arranged in a pre-determined pattern between the low refractive index glass rods. The preform is heated and drawn to form the non-porous photonic band-gap fiber.

1 Claim, 8 Drawing Sheets

| 12' ⬡ | Low refractive index |
| 16' ⬡ | Medium refractive index |
| 14' ⬡ | High refractive index |

MULTI-COMPONENT ALL GLASS PHOTONIC BAND-GAP FIBER

BACKGROUND

The present invention relates to a photonic crystal fiber, and more particularly, to a novel method of fabricating a photonic crystal fiber, having a non-porous, all glass structure.

Communication systems which utilize optical fibers are known. These fibers typically achieve guiding of light by means of total internal reflection, based on the presence of a solid core of a relatively high refractive index that is surrounded by a solid cladding that has a relatively low refractive index.

A new type of optical fiber has recently been proposed which is referred to as a "photonic crystal" or "photonic band gap" (PBG) fiber. The PBG fibers involve a structure having a refractive index that varies periodically in space (in the X-Y plane). This type of optical fiber is discussed in several articles including J. C. Knight et al., *Optics Letters*, Vol. 21, No. 19, P. 15–47 (October 1996); T. A. Burkes, et al., *Optics Letters*, Vol. 22, No. 13, P. 961 (July 1997). These PBG fibers are typically fabricated with silica fiber having air gaps in order to achieve a periodic structure in the array which has a large index difference. This is achieved by the air gaps in combination with the silica fiber creating a lower refractive index in comparison to the areas having silica fiber alone. The air gaps are typically created by a multiple stack and draw process in which the air gaps are formed by holes drilled in silica rod preforms which are then stacked and drawn in order to create the PBG fiber structure.

A PBG fiber is also known in which that it was discovered that there was no need for a periodicty in the X-Y plane (cross-section) of the fiber. It was found that if the fiber possesses a core region having a refractive index that is significantly higher than the effective index of a fraction of a cladding region that surrounds the core region which comprises the multiplicity of micro structural cladding features such as capillary voids, that a periodic array was not necessarily required. However, capillary voids are still utilized as the primary means of forming the cladding material. However, the voids may be filled with metal or glass with a lower melting temperature than the capillary tube material in a subsequent operation with a second melt at a lower temperature. This introduces additional manufacturing time and costs, and also raises additional quality control issues.

The prior art process of making PBG fibers is difficult and costly, and it would be desirable to have simpler, less costly methods for making PBG fibers. Furthermore, these porous fibers are problematic for use in systems where it is necessary to have a solid or vacuum tight connection. It is also difficult to achieve a small bend radius with porous PBG fibers without damaging the fibers.

SUMMARY

Briefly stated, the present invention provides a method of producing an all glass, non-porous, multi-component photonic band-gap fiber which includes the steps of creating a preform having a plurality of low refractive index glass rods and a plurality of high refractive index glass rods arranged in a pre-determined pattern between the low refractive index glass rods. The preform is heated and drawn to form a non-porous photonic band-gap fiber.

In another aspect, the invention provides for the assembly of the preform from a plurality of preform subassemblies which each have a predetermined number of low refractive index and high refractive index glass rods arranged in a predetermined pattern.

In another aspect, a method producing an all glass, non-porous, multi-component photonic band-gap multiple array is provided. The method includes creating a first PBG fiber by assembling a first preform having a plurality of low refractive index glass rods and a plurality of high refractive index glass rods which are arranged in a predetermined pattern between the low refractive index glass rods. The first preform is heated and drawn to form a first drawn non-porous subassembly having a first index. A second PBG fiber is created by assembling a second preform having a plurality of low refractive index glass rods and a plurality of medium refractive index glass rods which are arranged in a predetermined pattern between the low index glass rods. The second preform is heated and drawn to form a second drawn non-porous subassembly having a second index. A third preform is assembled from the first and second drawn non-porous subassemblies. The third preform is heated and drawn to form a non-porous multi-component PBG multiple index array.

DETAILED DESCRIPTION OF THE PREFERRED EMBODIMENTS

Figure 1:
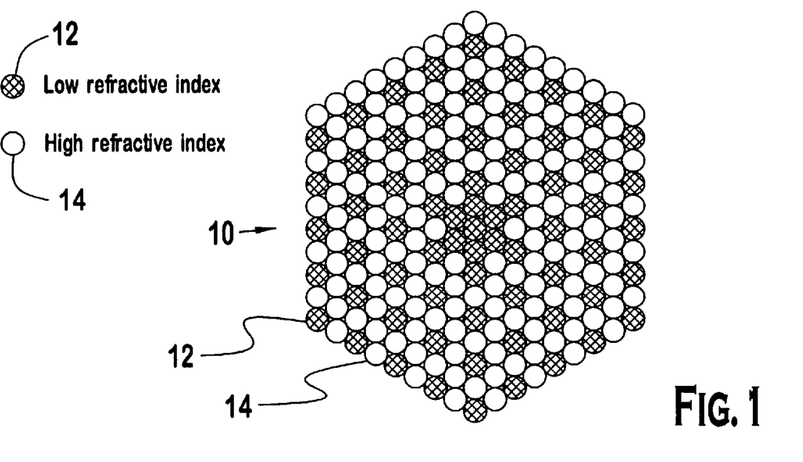
FIG. 1 is a cross-sectional view of a PBG fiber preform in accordance with the present invention.
Figure 1A:
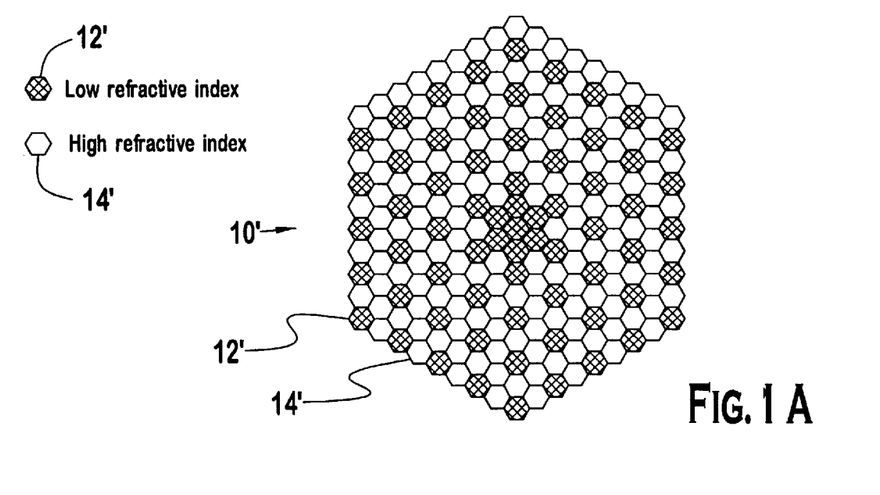
FIG. 1A is a cross-sectional view of the PBG fiber made from the preform of FIG. 1.

Referring now to FIG. 1, a preform 10 for a photonic band-gap ("PB") fiber [10] is shown in cross-section in the X-Y plane. This plane is normal to the longitudinal (Z) direction of the fiber, which can extend a substantial distance for transmission of an optic signal. The first embodiment of the PBG fiber is formed from a first plurality of low refractive index glass rods 12 and a plurality of high refractive index glass rods 14 arranged in a predetermined pattern between the low refractive index glass rods 12. The specific arrangement of the high index and low index glass rods 14, 12 in the preform 10 will determine the specific band-gaps in the light that can be transmitted through the finished fiber 10', shown in FIG. 1A. The preform 10 is then heated and drawn in the manner well known to those skilled in the art to form a non-porous photonic band-gap fiber 10' having a diameter of approximately 125 microns. During the drawing process, the individual glass rods 12, 14 in the PBG fiber 10' are drawn down to a size of approximately 0.25 microns. Preferably, the low refractive index glass rods have an index on the order of 1.47 and the high refractive index glass rods have an index over 1.81. However, different low and high refractive indices can be used depending upon the specific properties required. During the drawing process, the rods 12, 14 are fused together to form a solid, non-porous structure in cross-section, as shown in FIG. 1A where the drawn and fused rods are indicated as 12', 14', which allows the finished PBG fiber 10' to be vacuum tight. The solid PBG fiber offers better mechanical structure and stability than the prior known PBG fibers which utilize capillary air gaps as defects in order to form the PBG fibers.

While the first preferred embodiment of the fiber 10' is shown as being hexagonal in cross-section, other cross-sectional shapes, such as squares, circles or other forms can be utilized if desired. Additionally different arrangements of the low and high index glass rods 12, 14 can be utilized.

Figure 2:
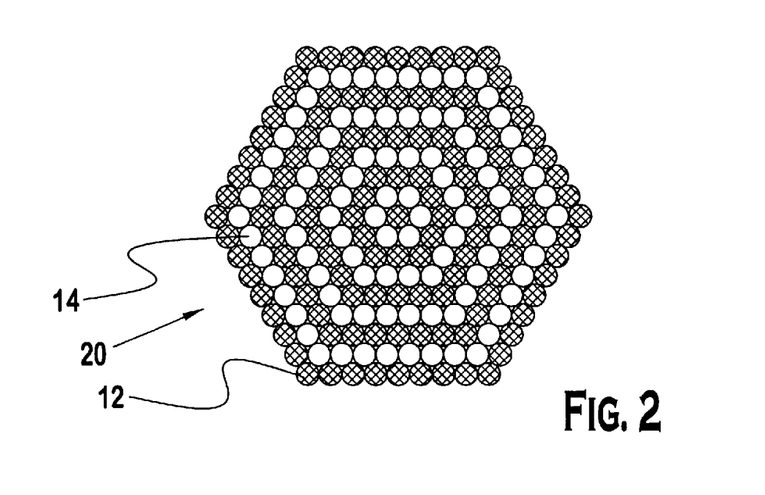
FIG. 2 is a cross-sectional view of a second embodiment of a PBG fiber preform in accordance with the present invention.
Figure 2A:
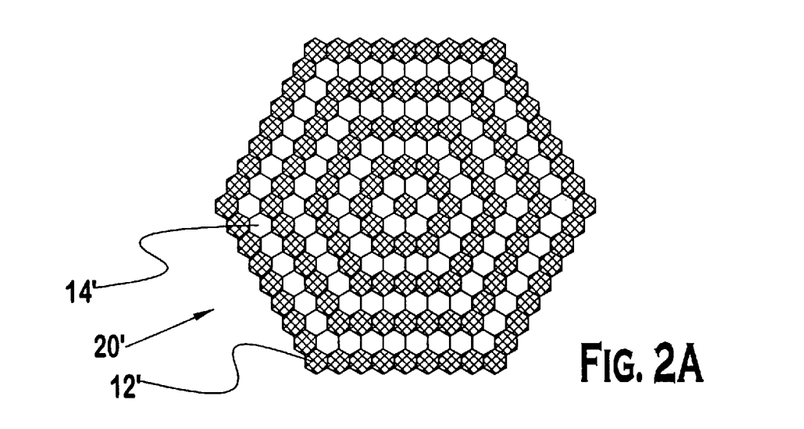
FIG. 2A is a cross-sectional view of the PBG fiber made from the preform of FIG. 2.

Referring now to FIG. 2A, a second preferred embodiment of a PBG fiber 20' is shown. In the second preferred embodiment, a periodic structure is achieved in the array by arranging the low index and high index glass rods 12 and 14 in concentric rings in the preform 20, as shown in FIG. 2. In the second preferred embodiment, a low refractive index glass rod 12 is located in the center of the preform 20. The preform 20 is heated and drawn in order to form the PBG fiber 20'.

Figure 3:
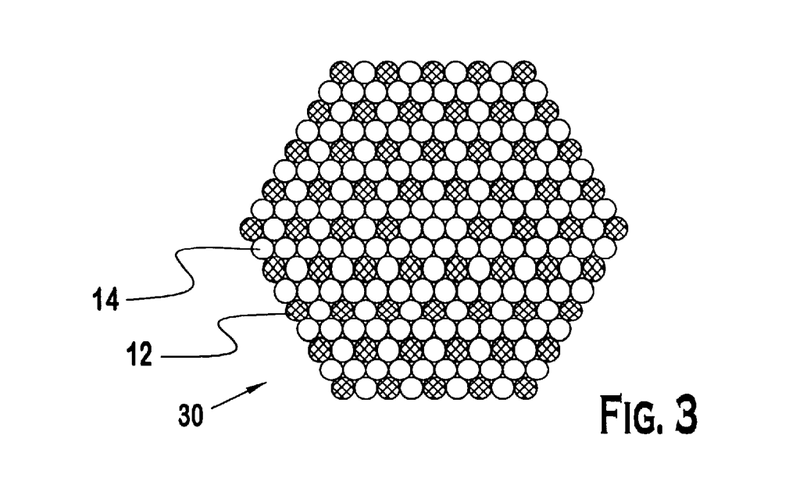
FIG. 3 is a cross-sectional view of a third preferred embodiment of a PBG fiber preform in accordance with the present invention.
Figure 3A:
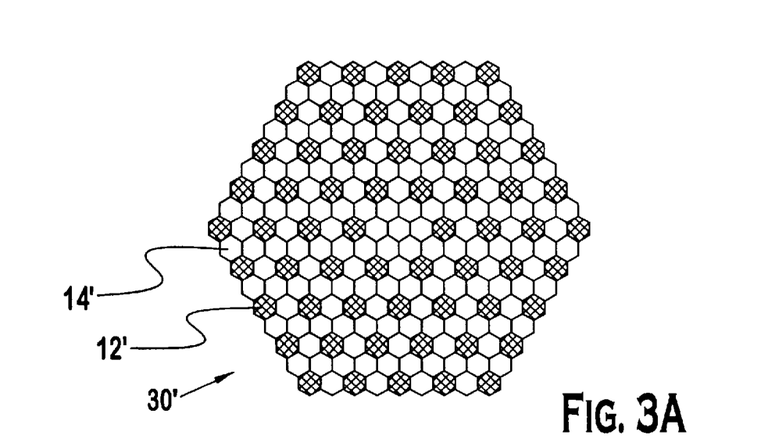
FIG. 3A is a cross-sectional view of the PBG fiber made from the preform of FIG. 3.

Referring now to FIG. 3A, a third preferred embodiment of a PBG fiber 30' is shown. In this case, the low refractive index glass rods 12-in the preform 30 shown in FIG. 3 are dispersed in a pattern such that each low refractive glass rod 12 is surrounded by six high index glass rods 14.

Figure 4:
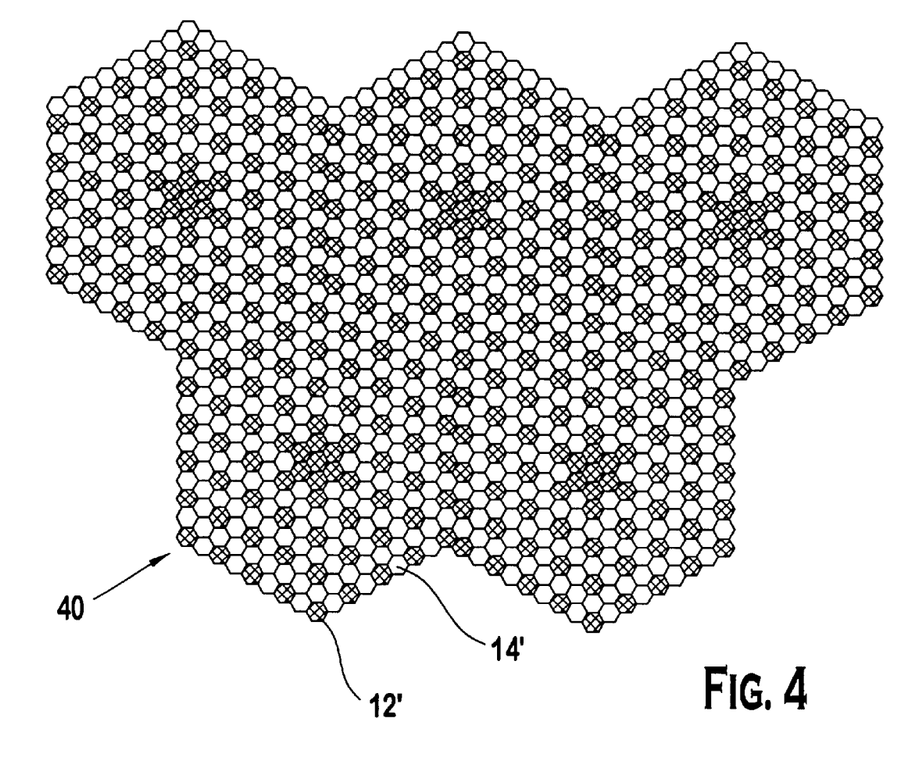
FIG. 4 is a cross-sectional view of a PBG array in accordance with the present invention.

Referring now to FIG. 4, a PBG array in accordance with a fourth preferred embodiment of the invention is shown. The PBG array 40 is formed by assembling a first stage preform subassembly having a predetermined number of the low refractive index glass rods 12 and the high refractive index glass rods 14 arranged in a predetermined pattern, such as the pattern shown in FIG. 1 for the PBG fiber preform 10. The glass rods in the first stage preform subassembly are heated and drawn to form drawn first-stage subassemblies. A second preform is created from a plurality of the drawn first stage subassemblies. This second preform is then heated and drawn to a desired size and can be used to make a face plate array of a larger size, such as 3 inch diameter plates, or can be drawn down to a smaller size, such as 125 microns in order to form a PBG fiber.

Figure 5:
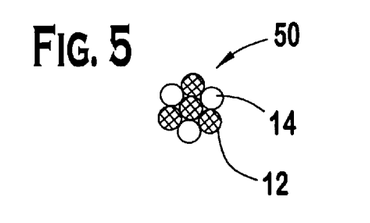
FIG. 5 is a cross-sectional view of a PBG preform subassembly in accordance with the present invention.
Figure 5A:
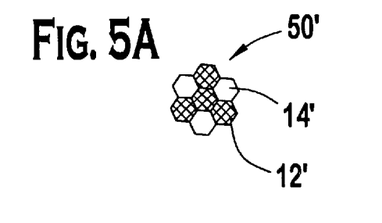
FIG. 5A is a cross-sectional view of the drawn preform from FIG. 5.
Figure 6:
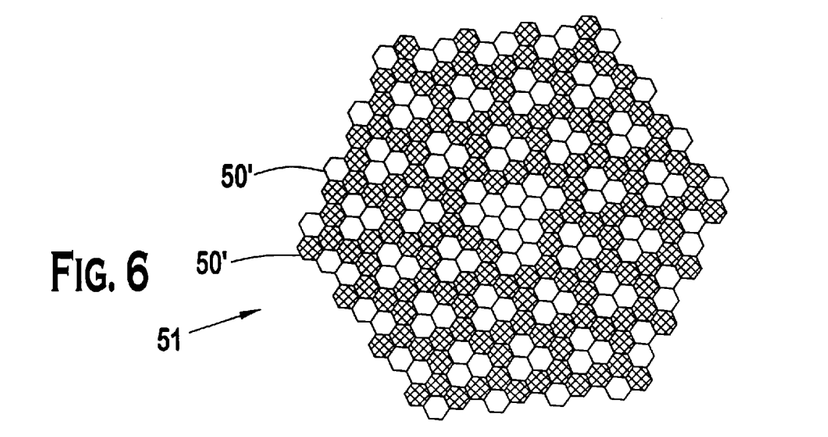
FIG. 6 is a cross-sectional view of a fourth embodiment of a PBG fiber formed from the assembly of the PBG subassembly shown in FIG. 5.

Referring now to FIGS. 5, 5A and 6, smaller preform subassembly 50 can be created from the low index glass rods 12 and high index glass rods 14. The smaller preform subassemblies 50 are drawn to form drawn preform assemblies, 50' as shown in FIG. 5A, which can then be utilized to create a preform for a PBG fiber 51 in accordance with a fifth preferred embodiment of the present invention. Again, during the drawing process, all air is removed from the fiber to form a solid glass PBG fiber 51.

Figure 7:
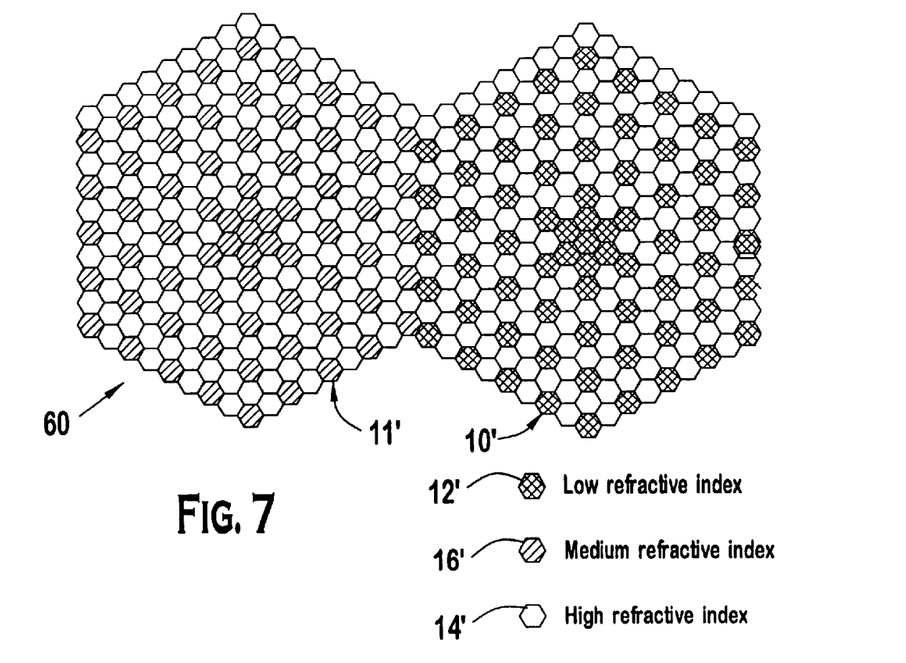
FIG. 7 is a cross-sectional view of a PBG array having multiple indexes in accordance with the present invention.

Referring now to FIG. 7, a portion of a PBG array 60 in accordance with a sixth preferred embodiment of the invention is shown. The PBG array 60 is assembled utilizing drawn preforms similar to that discussed above in connection with FIG. 1. A first photonic band-gap optical fiber 10' is assembled as a first preform having a plurality of low refractive index glass rods 12 and a plurality of high refractive index glass rods 14 arranged in a pre-determined pattern between the low refractive index glass rods 12'. The preform is <7 heated and drawn to form a first drawn non-porous subassembly 10' having a first index. A second photonic band-gap optical fiber 11' is assembled as a second preform having a plurality of low refractive index glass rods 12 and a plurality of medium refractive index glass rods 16 arranged in a predetermined pattern, which is shown as being the same as the pattern utilized to create the first PBG fiber 10. The second preform is heated and drawn to form the second drawn non-porous subassembly 11' having a second index. A third preform is assembled from a plurality of the first and second drawn non-porous subassemblies 10' and 11'. The third preform is then heated and drawn to form a non-porous multi-photonic band-gap multiple index array 60. The number of subassemblies 10' and 11' utilized in the array can be varied depending upon the particular application. Additionally, the shape of the first and second drawn non-porous subassemblies can be varied depending upon the particular application. Preferably, the medium refractive index glass rods 16 have an index of 1.6. However, those skilled in the art will recognize that other different indices can be utilized depending upon the effect desired.

Figure 8:
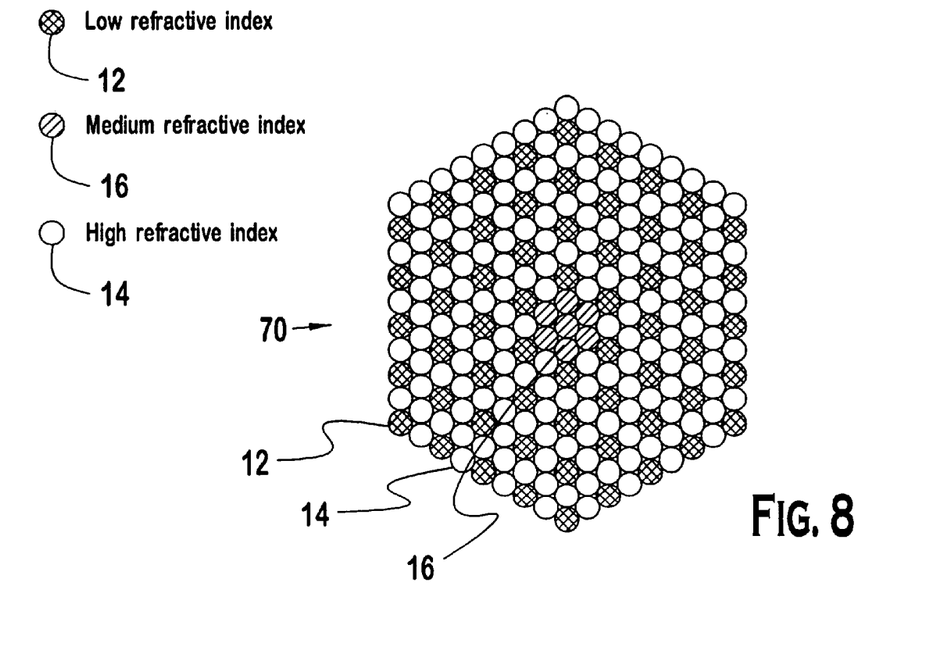
FIG. 8 is a cross-sectional view of a sixth embodiment of a PBG fiber preform formed from multiple index materials.
Figure 8A:
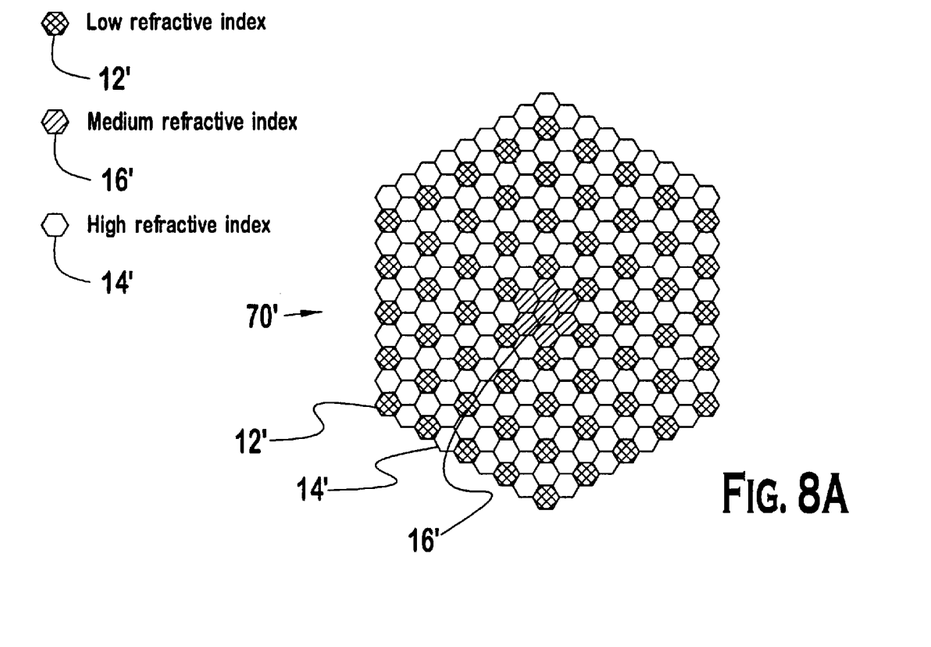
FIG. 8A is a cross-sectional view of the PBG fiber made from the preform of FIG. 8.

Referring now FIG. 8, a preform 70 seventh preferred embodiment of a PBG fiber is shown. The PBG fiber preform 70 is assembled from low, medium and high refractive index glass rods 12, 14 and 16 which are assembled in a preform in a desired pattern. The preform 70 is heated and drawn in order to form the PBG fiber 70', as shown in FIG. 8A, where the drawn rods are indicated as 12', 14' and 16'. This has the advantage of allowing for control of fiber dispersion properties.

Figure 9:
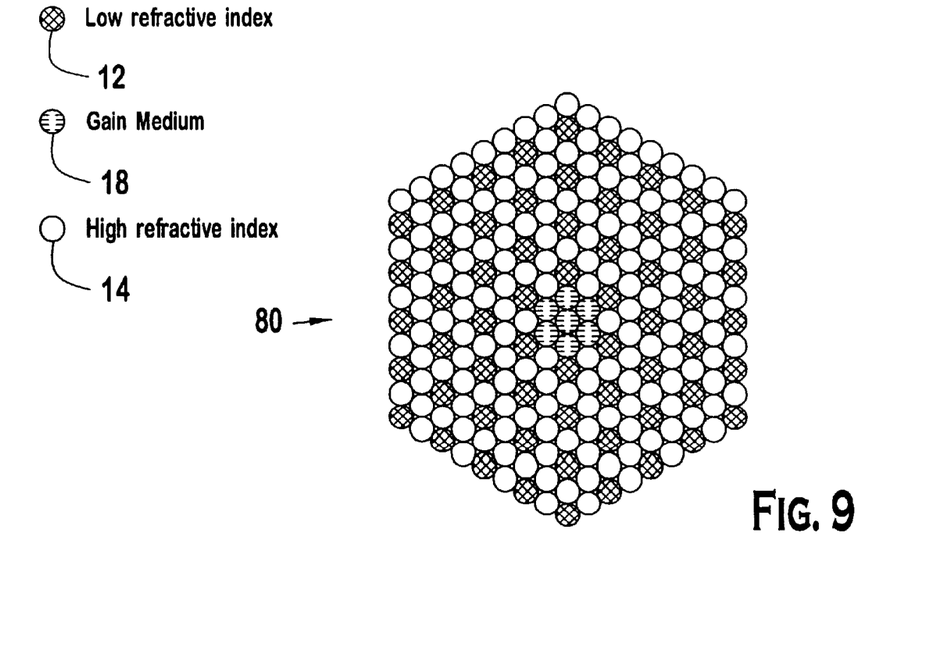
FIG. 9 is a cross-sectional view of a PBG fiber preform having a Gain Medium located in the fiber.
Figure 9A:
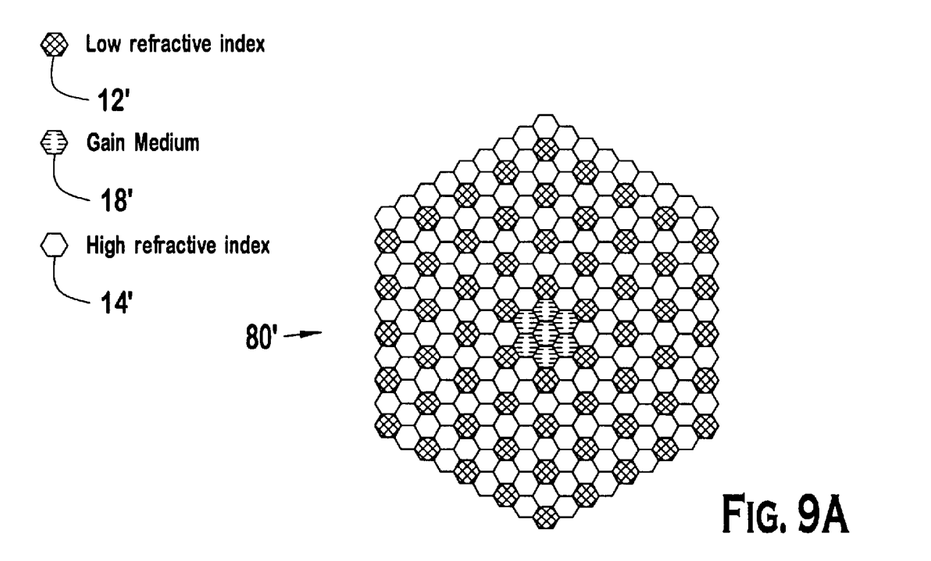
FIG. 9A is a cross-sectional view of the PBG fiber made from the preform of FIG. 9.

Referring now to FIG. 9, a preform 80 for an eighth preferred embodiment of a PBG fiber is shown. The PBG fiber preform 80 is comprised of a plurality of low index and high index glass rods 12 and 14 which are arranged in a preform. A gain medium 18, which preferably comprises doped glass rods, is located in the center of the preform 80. The preform 80 is heated and drawn in order to form the eighth preferred embodiment of the PBG fiber 80', as shown in FIG. 9A where the drawn rods are indicated as 12', 14' and 18'.

The use of a gain medium in this arrangement has particular advantage for use in forming an amplifier or a laser if appropriate reflective and coupling coatings are provided on the ends of a segment of the PBG fiber 80' thus formed, in order to intensify light energy which enters the gain medium, or provide lasing.

Figure 10:
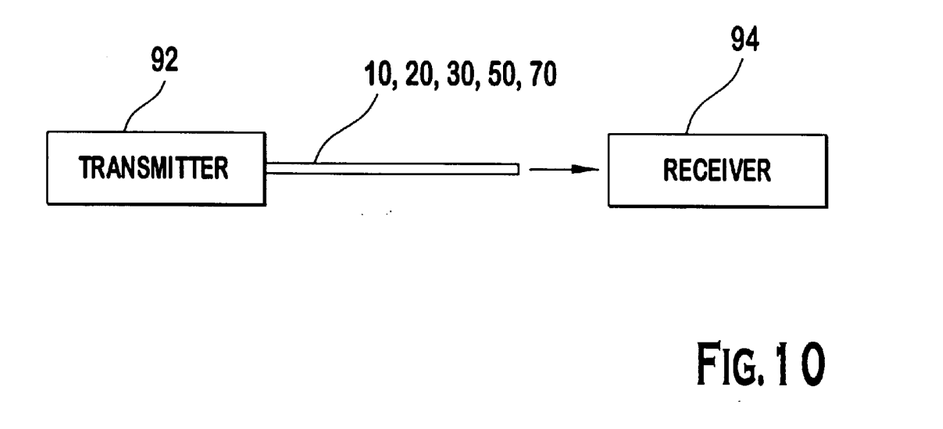
FIG. 10 is a schematic view of an optical fiber communication system comprising a PBG fiber in accordance with the present invention.

The above-noted embodiments of the PBG fiber and/or arrays are intended to be examplary only, and different glass layouts and fibers counts can be employed. All of the embodiments of the PBG fiber offer lower cost manufacture and improved mechanical structural stability in comparison to the known prior art PBG fibers which utilize capillary air openings as the defect in the fibers. This allows tight bend angles which were not possible with the prior known PBG fibers, and forming the present PBG fiber as a solid, vacuum tight material, allows for use in different applications. A particularly advantageous application is for use in fiber optic communication systems, where the PBG fiber is located between a light signal transmitter 92 and a light signal receiver 94, as shown in FIG. 10.

Another useful property provided by the PBG drawn fiber is that it provides a useful means for locating defects in the final product. It has been observed experimentally that light inserted in the PBG can not propogate in the ordered regions (as expected), but can find the defects, such as missing or misplaced fibers, and be guided therein. This allows the defects in an array of drawn fibers to be measured.

Figure 11:
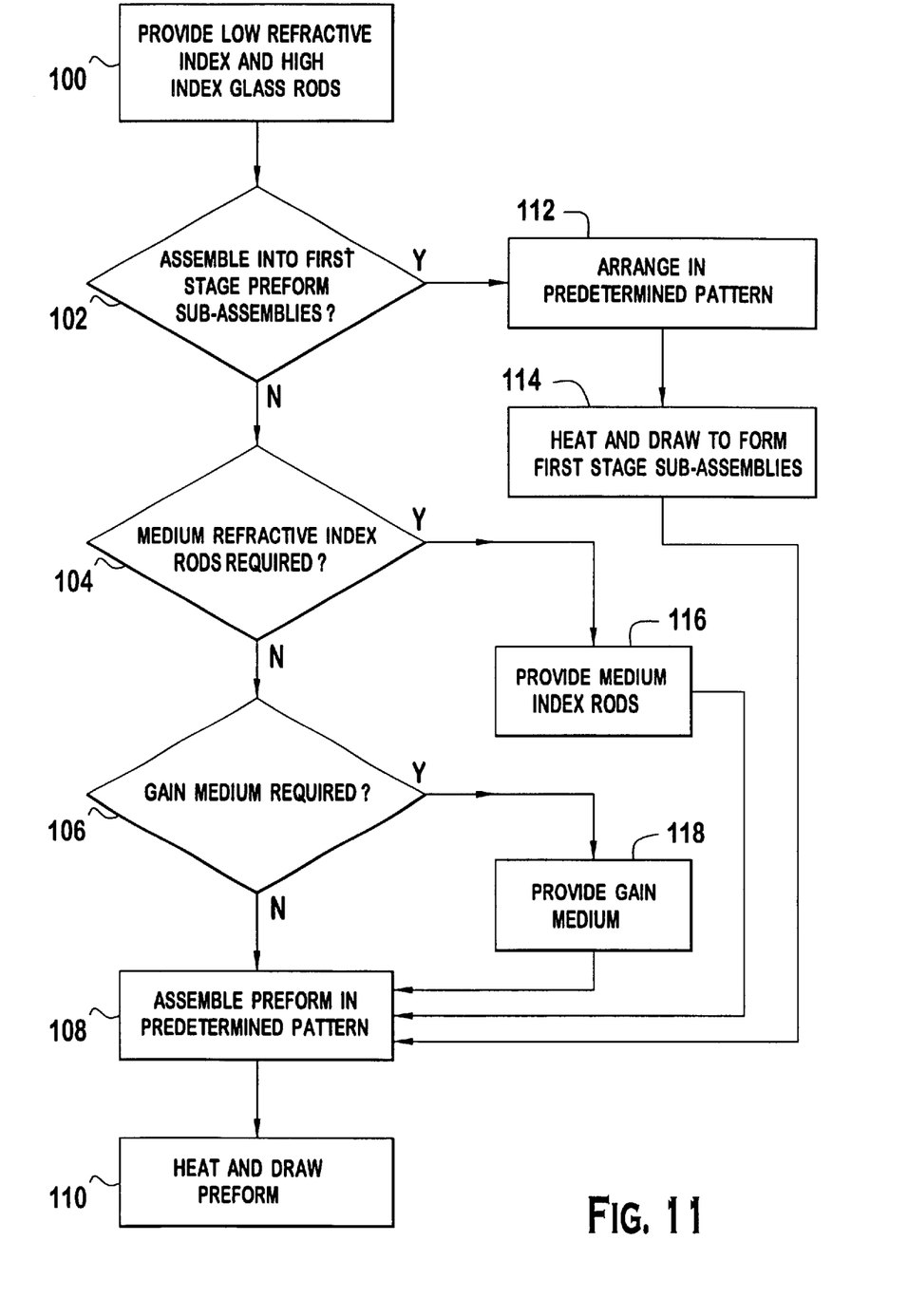
FIG. 11 is a flow chart showing the process for creating a preform in accordance with the invention.

The process for making the PBG fibers 10', 20', 30', 50', 70', 80' and the array 40 is summarized in the flow chart of FIG. 11. As shown in box 100, in each case low and high refractive index glass rods 12, 14 are provided. These low and high index rods 12, 14 can be assembled into first stage subassemblies if the array 40 shown in FIG. 4 is to be formed, as shown in box 102. In this case the low and high index rods 12, 14 are arranged in a predetermined pattern, as indicated in box 112, and are then heated and drawn, as shown in box 114. The array 40 is formed by assembling the first stage subassemblies into the preform, as shown in box 108. The preform is then heated and drawn, as shown in box 110. If the low and high index rods 12, 14 are not going to be assembled into a first stage reform, for example when making the PBG fibers 10', 20', 30', as shown in FIGS. 1-3, the low and high index rods 12, 14 are assembled to form the preform, as shown in box 108, which is then heated and drawn, as shown in box 110.

If medium refractive index rods 16 are required, as shown in box 104, for example in making the PBG fiber 70' shown in FIG. 8, medium refractive index rods 16 are provided, as shown in box 116, and are assembled in the preform with the low and high refractive index rods 12, 14, as shown in box 108. The preform is then heated and drawn, as shown in box 110.

If a gain medium is required, as shown in box 106, for example in making the fiber 80' shown in FIG. 9, a gain medium is provided, as shown in box 118, and this is assembled into the preform with the low index and high index rods 12, 14, as shown in box 108. The preform is then heated and drawn, as shown in box 110.

Figure 12:
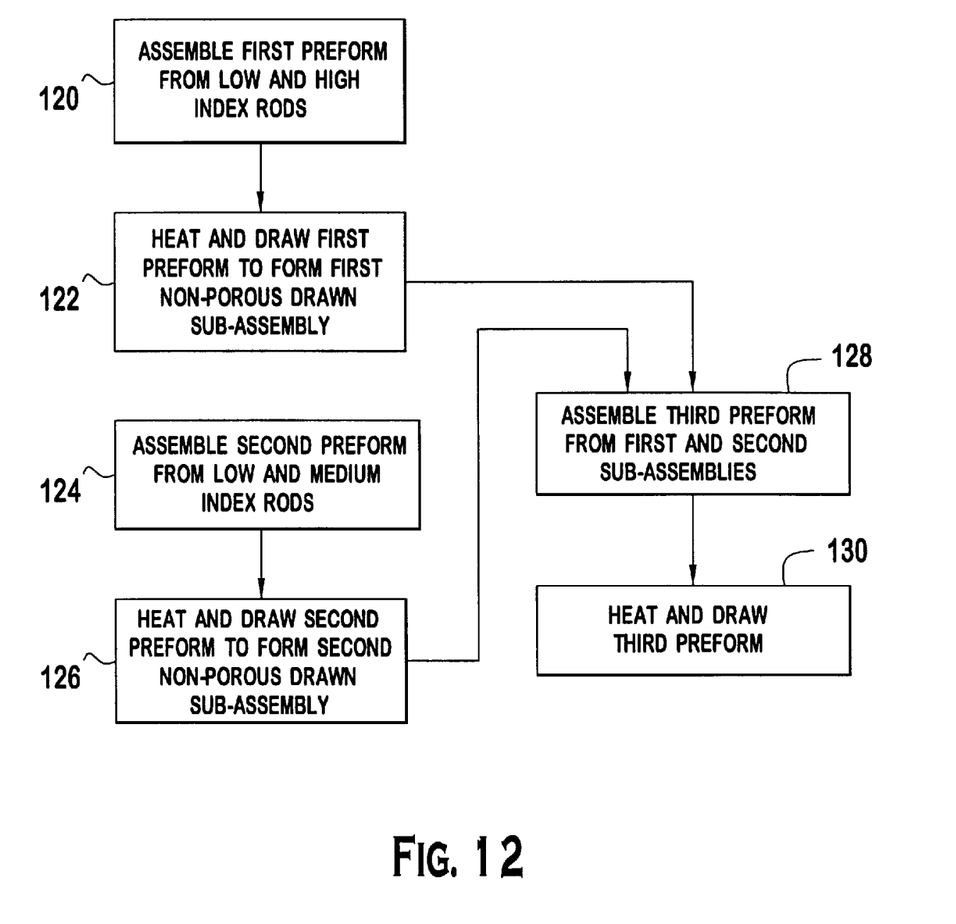
FIG. 12 is a flow chart showing the process of assembling the third preform from first and second non-porous PBG optical fibers.

Referring to FIG. 12, the process for forming a non-porous multi-photonic band-gap multiple index array 60, such as shown in FIG. 7 is shown. As shown in box 120, the first photonic band-gap optical fiber is created by assembling a first preform having a plurality of low refractive index glass rods 12 and a plurality of high refractive index glass rods 14 arranged in a predetermined pattern. As shown in box 122, the first preform is heated and drawn to form a first drawn non-porous subassembly having a first index. As shown in box 124, the second photonic band-gap optical fiber is created by assembling a second preform having a second plurality of low refractive index glass rods 14 and a plurality of medium refractive index glass rods 16 arranged in a predetermined pattern. As shown in box 126, the second preform is heated and drawn to form a second drawn non-porous subassembly having a second index. As shown in box 128, the third preform from the first and second drawn non-porous subassemblies. As shown in box 130, the third preform is heated and drawn to form the non-porous, multi-component photonic band-gap multiple index array 60.

While the preferred embodiments of the invention have been described in detail, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A method of producing an all glass, non-porous, multi-component photonic band-gap multiple index array comprising:

creating a first photonic band-gap optical fiber by assembling a first preform having a plurality of low refractive index glass rods and a plurality of high refractive index glass rods arranged in a predetermined pattern between the low refractive index glass rods, and heating and drawing the first preform to form a first drawn non-porous subassembly having a first index;

creating a second photonic band-gap optical fiber by assembling a second preform having a second plurality of low refractive index glass rods and a plurality of medium refractive index glass rods arranged in a predetermined pattern between the second plurality of low refractive index glass rods, and heating and drawing the second preform to form a second drawn non-porous subassembly having a second index; and assembling a third preform from the first and second drawn non-porous subassemblies, and heating and drawing the third preform to form a non-porous, multi-component photonic band-gap multiple index array.

* * * * *